W. C. HAFEMEISTER.
PORTABLE ELECTRIC DRILL.
APPLICATION FILED DEC. 11, 1908.

956,849.

Patented May 3, 1910.

2 SHEETS—SHEET 2.

Witnesses
J. C. Turner
Jno. F. Oberlin

Inventor:
William C. Hafemeister
by J. B. Fay
Attorney.

UNITED STATES PATENT OFFICE.

WILLIAM C. HAFEMEISTER, OF CLEVELAND, OHIO, ASSIGNOR, BY MESNE ASSIGN-MENTS, TO THE VAN DORN & DUTTON COMPANY, OF CLEVELAND, OHIO, A CORPORATION OF OHIO.

PORTABLE ELECTRIC DRILL.

956,849.     Specification of Letters Patent.     Patented May 3, 1910.

Application filed December 11, 1908. Serial No. 466,960.

*To all whom it may concern:*

Be it known that I, WILLIAM C. HAFEMEISTER, a citizen of the United States, and a resident of Cleveland, county of Cuyahoga, and State of Ohio, have invented a new and useful Improvement in Portable Electric Drills, of which the following is a specification, the principle of the invention being herein explained and the best mode in which I have contemplated applying that principle, so as to distinguish it from other inventions.

This invention, relating as indicated to portable drills, has more particular regard to the construction of the casing and of certain intermediate gearing in such drills, the object being to provide a structure more economical to build and one at the same time more durable in use.

It will be understood of course, that the invention comprehends other tools analogous to the drill, as also that, while the particular type of motor herein illustrated for operating of the tool, is an electric motor, at least certain of the features of the invention will be equally adaptable for incorporation in a tool where other motive power than electricity is employed.

Said invention, then, consists of the means hereinafter fully described and particularly pointed out in the claims.

The annexed drawings and the following description set forth in detail certain mechanism, embodying the invention, such disclosed means constituting, however, but one of various mechanical forms in which the principle of the invention may be used.

Figure 1:
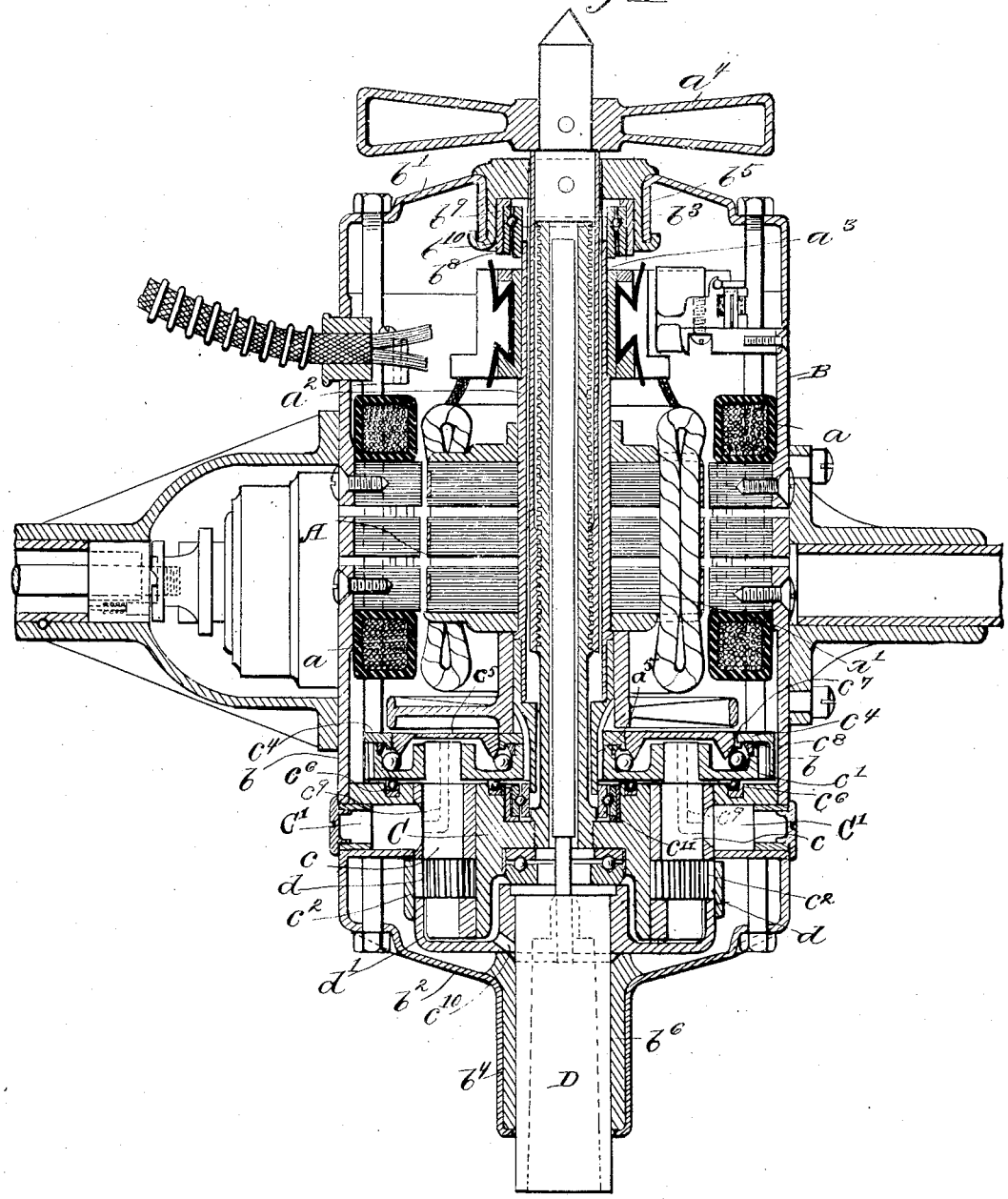
Figure 2:
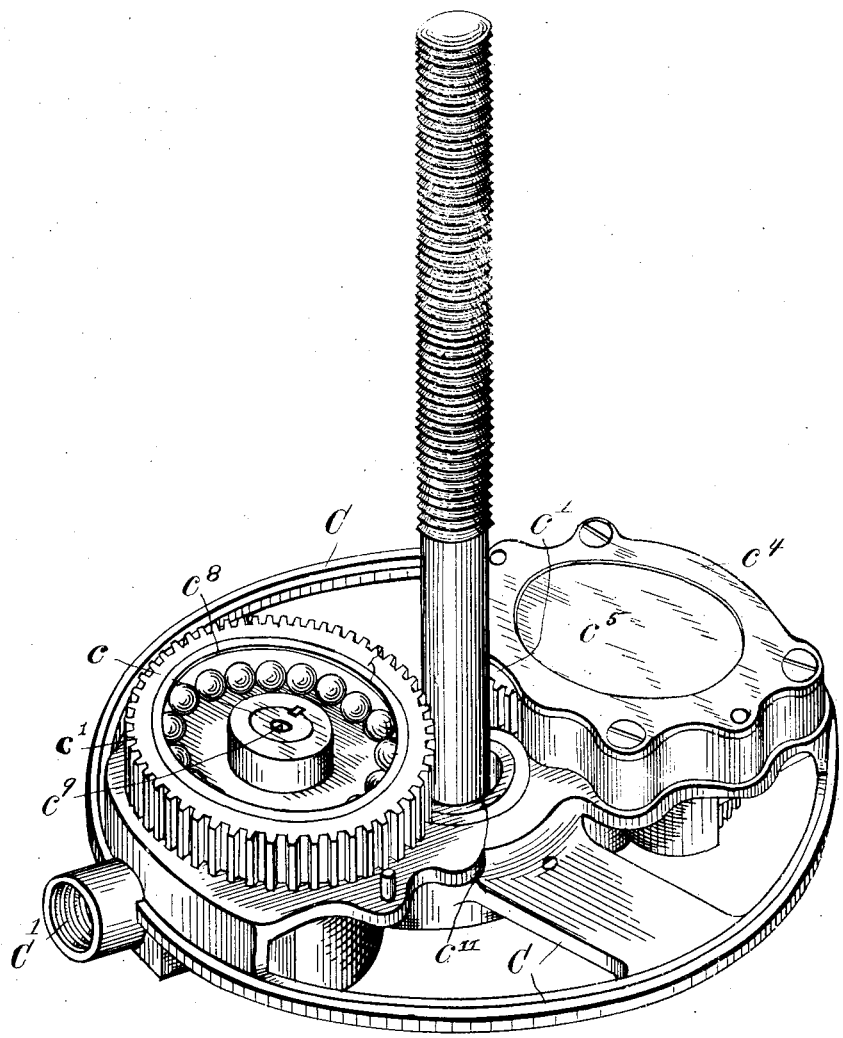

In said annexed drawings:—Figure 1 is an axial section of an electrically operated portable drill embodying my several improvements; and Fig. 2 is a perspective view of an interior supporting member together with the parts borne thereby.

Having regard first of all to Fig. 1, the tool will be seen to comprise a motor A that is included within a casing B, consisting of a body portion $b$ of substantially cylindrical form, and two end portions or caps $b'$ $b^2$ therefor. Such body portion is preferably made out of drawn seamless tubing, while the caps are stamped out of sheet metal, being formed respectively with an inwardly and outwardly projecting flange $b^3$ $b^4$ for the reception of bearings $b^5$ $b^6$ as will be presently described.

The motor proper comprises the field coils $a$ that are secured to the inner surface of the cylindrical casing body $b$ and an armature $a'$ mounted upon the tubular motor shaft $a^2$ of which the one end is journaled in bearings $b^5$ in the upper cap, the other end in bearing $c^{11}$ in a transversely disposed member C secured within the casing near its lower end. Alined with said motor shaft, is the drill spindle D mounted in a suitable bushing press-fitted in the flange in the lower cap. The bearing $b^5$ for the motor shaft provided in the upper cap $b'$ comprises a bushing similarly press-fitted into the opening in said cap, the inner end of said bushing being bent over to engage the flange surrounding such opening. An internally threaded ring $b^8$ is tightly fitted within said bushing and other rings $b^9$ $b^{10}$ in turn are fitted within said first ring, so as to provide an adjustable ball race, as will be readily understood upon reference to the drawing in question. Lying within the motor shaft $a^2$, which is hollow, is a feed screw, $a^3$ whereby the tool may be forced onto the work, upon suitably rotating the handle $a^4$, as will likewise be readily understood. The lower end of the motor shaft is provided with a driving pinion $a^5$ from which motion is transmitted to an internal gear $d$ mounted upon the drill spindle, by means of the intermediate gearing now to be described. Such internal gear upon the drill spindle is in effect part of a cup-like member $d'$ that is mounted directly upon the spindle, such cup-like member serving to receive the lower portion of the intermediate casing member C previously referred to as supporting the intermediate gearing. The latter comprises (see Fig. 2) two short intermediate shafts $c$ each of which bears at its upper end a gear $c'$ that meshes with the driving pinion $a^5$ on the motor shaft and at the lower end a pinion $c^2$ that meshes with the internal gear $d$ upon the drill spindle. Bearings for such intermediate shafts are formed in said member between the gear $c'$ and pinion $c^3$ and in the lower portion of the member that extends below such pinion and into the recess formed in the cup-shaped gear-bearing member $d'$ of the spindle. The gear $c'$ whereby such shaft is connected with the motor shaft is recessed on its upper face to form one part of a ball-race, and a cap $c^4$ mounted upon the supporting member C and inclosing said gear includes a central plate $c^5$ screw-threaded therein, and bearing the other part of such race, which in conjunction with a ball-race $c^6$ between the gear and the supporting member, provides an end thrust bearing for the intermediate shaft. The gear-inclosing cap $c^4$ is further provided with a circular flange $c^7$ on its under side and the gear with a washer $c^8$, the edge of which closely fits in the angle between said flange and the cap proper, so as to prevent the escape of lubricant from the chamber formed between such cap and the upper face of the gear. The lubricant is designed to be supplied to this chamber from an oil chamber or cup C' in the supporting member, that extends exteriorly through the casing A, and communicates interiorly with the bearing of the corresponding intermediate shaft. The latter being provided with a passage $c^9$ adapted to connect said oil-supply chamber or cup with the chamber formed between the cap and the upper face of the gear, the lubricant will be fed to such latter chamber and thence to the ball races and intermeshing gear teeth. At the same time sufficient lubricant will escape downwardly along the bearing with which the chamber communicates, to amply provide for the lubrication of the pinion $c^3$ and the lower bearing of the shaft, any excess of lubricant being conserved in the depression formed in the upper portion of the gear-bearing member $d'$, thence to be fed to the spindle bearing in bushing $b^6$ by another passage $c^{10}$. Such oil chambers or cups, it should be noted serve the further function of dowel pins, to retain supporting member in place within the casing.

The foregoing construction of drill has been found to provide an extremely rigid support for the various moving parts, without sacrificing but rather securing additional compactness and lightness, both of which are extremely desirable characteristics in a portable tool, and need not be explained at length. Moreover the use of stamped caps renders the construction much more economical, than where the same are cast and then machined in order to be fitted to the casing, and to provide the necessary bearings for the motor shaft and spindle. Finally by providing the end thrust bearings for the intermediate shafts, and furnishing ample lubricating means, these parts, which are subjected to the severest wear, are enabled to endure substantially as long as the remainder of the machine, thus contributing to the durability and practical character of the latter.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a tool of the character described, the combination with a motor and a casing therefor; of a transversely disposed supporting member within said casing near one end thereof, the motor shaft being journaled in said member and the other casing end; a tool spindle mounted in such first-named casing end; a gear borne by the inner end of said spindle; a driving pinion on the adjacent end of said motor-shaft; an intermediate shaft extending through and journaled in said supporting member; a pinion on its lower end meshing with said spindle gear; a gear on its upper end meshing with said driving pinion; and thrust bearings for the upper end of said intermediate shaft.

2. In a tool of the character described, the combination with a motor and a casing therefor; of a transversely disposed supporting member within said casing near one end thereof, the motor-shaft being journaled in said member and the other casing end; a tool spindle mounted in such first-named casing end; a gear borne by the inner end of said spindle; a driving pinion on the adjacent end of the motor-shaft; an intermediate shaft extending through and journaled in said supporting member; a pinion on its lower end meshing with said spindle gear; a gear on its upper end meshing with said driving pinion, the upper face of said last-named gear forming one part of a ball race; a cap mounted upon said supporting member and inclosing said gear, said cap bearing the other part of such race; and a ball race between said gear and member, whereby an end-thrust bearing is provided for said intermediate shaft.

3. In a tool of the character described, the combination with a motor and a casing therefor; of a transversely disposed supporting member within said casing near one end thereof, the motor-shaft being journaled in said member and the other casing end; a tool spindle mounted in such first-named casing end; a gear borne by the inner end of said spindle; a driving pinion on the adjacent end of the motor-shaft; intermediate shafts extending through and journaled in said supporting member; a pinion on the lower end of each such intermediate shaft meshing with said spindle gear; a gear on such shaft's upper end meshing with said driving pinion, the upper face of said last-named gear being recessed to form one part of a ball race; a cap mounted upon said supporting member and inclosing said gear, said cap including a central plate adjustably secured therein and bearing the other part of such race; and a ball race between said gear and member, whereby an end-thrust bearing is provided for said intermediate shaft.

4. In a tool of the character described, the combination with a motor and a casing therefor; of a transversely disposed supporting member within said casing near one end thereof, the motor-shaft being journaled in said member and the other casing end; a tool spindle mounted in such first-named casing end; a gear borne by the inner end of said spindle; a driving pinion on the adjacent end of the motor-shaft; intermediate shafts extending through and journaled in said supporting member; a pinion on the lower end of each such intermediate shaft meshing with said spindle gear; a gear on each shaft's upper end meshing with said driving pinion, the upper face of said last-named gear being recessed to form one part of a ball race; a cap mounted upon said supporting member and inclosing said gear, said cap including a central plate screw-threaded in said cap and bearing the other part of such race; a circular flange on the under side of said cap, said gear bearing a washer exteriorly fitted to said flange; and a ball race between said gear and member.

5. In a tool of the character described, the combination with a motor and a casing therefor; of a transversely disposed supporting member within said casing near one end thereof, the motor-shaft being journaled in said member and the other casing end; a tool spindle mounted in such first-named casing end; a gear borne by the inner end of said spindle; a driving pinion on the adjacent end of said motor-shaft; an intermediate shaft extending through and journaled in said supporting member; a pinion on its lower end meshing with said spindle gear; a gear on its upper end meshing with said driving pinion; and an oil chamber in said supporting member opening exteriorly through said casing and communicating interiorly with the bearing of said intermediate shaft, the latter being provided with a passage adapted to connect said oil chamber with the upper face of the gear borne by said shaft.

6. In a tool of the character described, the combination of a motor and a casing therefor; of a transversely disposed supporting member within said casing near one end thereof, the motor-shaft being journaled in said member and the other casing end; a tool spindle mounted in such first-named casing end; a gear borne by the inner end of said spindle; a driving pinion on the adjacent end of said motor-shaft; an intermediate shaft extending through and journaled in said supporting member; a pinion on its lower end meshing with said spindle gear; a gear on its upper end meshing with said driving pinion; a cap mounted upon said supporting member and inclosing said gear; and an oil chamber in said supporting member opening exteriorly through said casing and communicating interiorly with the bearing of said intermediate shaft, the latter being provided with a passage adapted to connect said oil chamber with the chamber formed between said cap and the upper face of the gear borne by said shaft.

7. In a tool of the character described, the combination of a motor and tool spindle; a casing for said motor, said casing comprising a body portion and two stamped metal end portions or caps with central, flanged openings; a supporting member within said casing intermediate between said caps, said member having a bearing for one end of the motor-shaft; and bearings for the tool spindle and the other end of said motor-shaft fitted in the flanged openings in said caps, such last-named motor bearing including a bushing pressed into such opening and bent over to engage the flange, an internally threaded ring fitted within said bushing, and other rings, composing a ball race, secured within said first ring.

8. In a tool of the character described, the combination with a motor and a casing therefor; of a transversely disposed supporting member within said casing near one end thereof, the motor-shaft being journaled in said member and the other casing end; a tool spindle mounted in such first-named casing end; an internal gear borne by the inner end of said spindle and formed with a depression on its upper face; a driving pinion on the adjacent end of said motor-shaft; an intermediate shaft extending through and journaled in said supporting member; a pinion on its lower end meshing with said spindle gear; a gear on its upper end meshing with said driving pinion; and an oil chamber in said supporting member opening exteriorly through said casing and communicating interiorly with the bearing of said intermediate shaft, a passage being provided in said spindle gear leading from the depression therein to the spindle-bearing.

9. In a tool of the character described, the combination with a motor and a casing therefor; of a transversely disposed supporting member within said casing near one end thereof, the motor-shaft being journaled in said member and the other casing end; a tool spindle mounted in such first-named casing end; an internal gear borne by the inner end of said spindle and formed with a depression on its upper face; an intermediate shaft extending through and journaled in said supporting member; a pinion on its lower end meshing with said spindle gear; a gear on its upper end meshing with said driving pinion; a cap mounted upon said supporting member and inclosing said gear; and an oil chamber in said supporting member opening exteriorly through said casing and communicating interiorly with the bearing of said intermediate shaft, the latter being provided with a passage adapted to connect said oil chamber with the chamber formed between said cap and the upper face of the gear borne by said shaft, and another passage being provided in said spindle-gear leading from the depression therein to the spindle bearing.

10. In a tool of the character described, the combination with a motor and a casing therefor; of a transversely disposed supporting member within said casing near one end thereof, the motor-shaft being journaled in said member and the other casing end; a tool-spindle mounted in such first-named casing end; a gear borne by the inner end of said spindle and formed with a depression on its upper face adapted to retain lubricant, said gear being provided with a passage extending from such depression to the spindle bearing; a driving pinion on the adjacent end of said motor-shaft; an intermediate shaft extending through and having spaced bearings in said supporting member; a pinion on said intermediate shaft between said spaced bearings and meshing with said spindle gear; and a gear on the upper end of said shaft meshing with said driving pinion.

11. In a tool of the character described, the combination with a motor and a casing therefor; of a transversely disposed supporting member within said casing near one end thereof, the motor-shaft being journaled in said member and the other casing end; a tool spindle mounted in such first-named casing end; an annular gear borne by the inner end of said spindle and formed with a depression on its upper face; a driving pinion on the adjacent end of said motor-shaft; an intermediate shaft extending through and having spaced bearings on said supporting member, the lower of such bearings lying in the depression in said spindle gear; a pinion on said intermediate shaft between such bearings and meshing with said spindle gear; and a gear on its upper end meshing with said driving pinion.

12. In a tool of the character described, the combination with a motor and a casing therefor; of a transversely disposed supporting member within said casing near one end thereof, the motor-shaft being journaled in said member and the other casing end; a tool spindle mounted in such first-named casing end; an annular gear borne by the inner end of said spindle and formed with a depression on its upper face adapted to retain lubricant, said gear being provided with a passage extending from such depression to the spindle bearing; a driving pinion on the adjacent end of said motor-shaft; an intermediate shaft extending through and having spaced bearings on said supporting member, the lower of such bearings lying in the depression in said spindle gear; a pinion on said intermediate shaft between such bearings and meshing with said spindle gear; and a gear on its upper end meshing with said driving pinion.

Signed by me this 7th day of December, 1908.

WILLIAM C. HAFEMEISTER.

Attested by—
H. L. SCHNEIDER,
JNO. F. OBERLIN.